Dec. 8, 1964    I. R. HAUTALA    3,160,227
SOUNDPROOF CAMERA ENCLOSURES
Filed June 25, 1962    2 Sheets-Sheet 1

INVENTOR.
IRVING R. HAUTALA
BY CULLEN, SLOMAN, & CANTOR.
ATTORNEYS

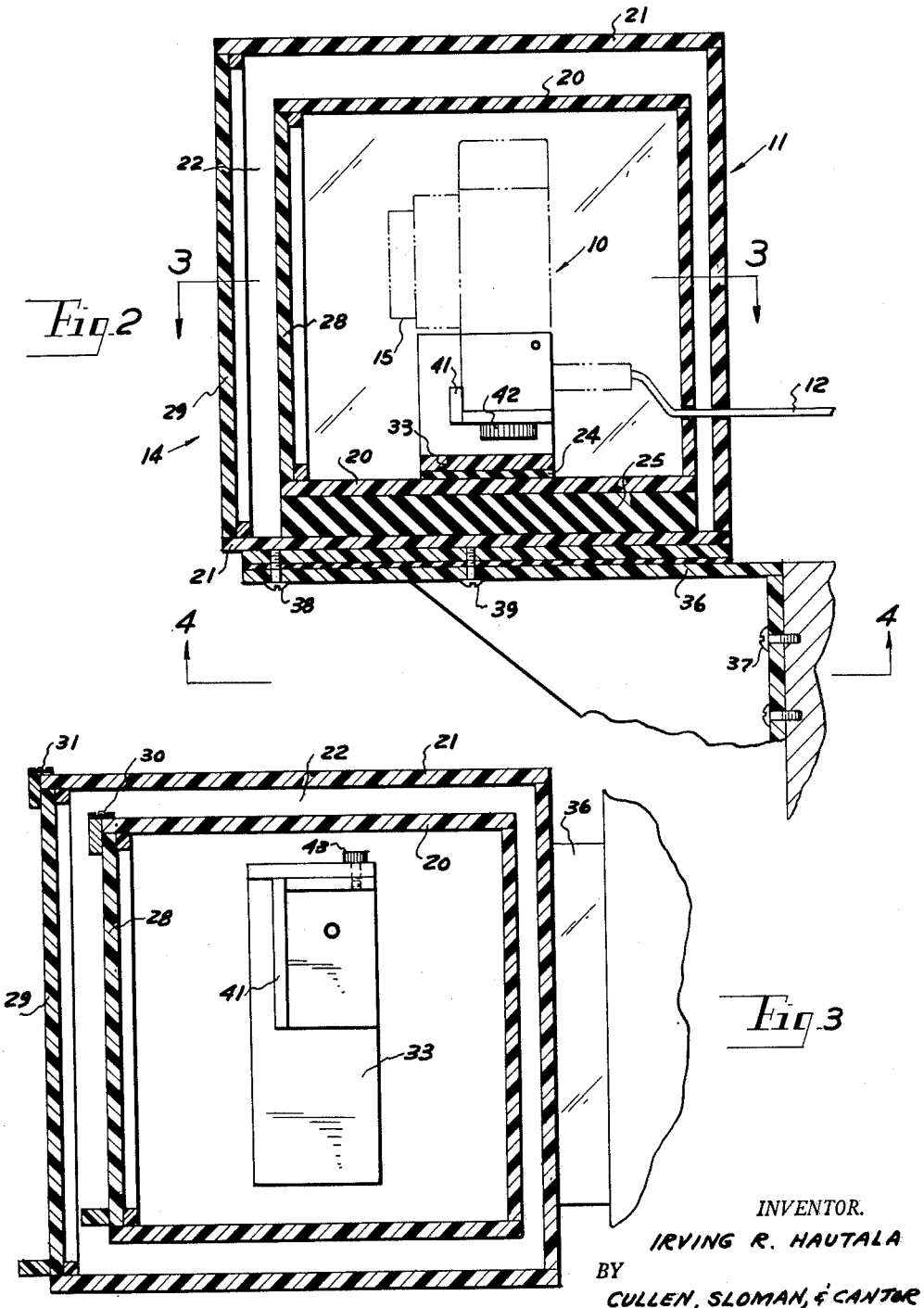

United States Patent Office 3,160,227
Patented Dec. 8, 1964

3,160,227
SOUNDPROOF CAMERA ENCLOSURES
Irving R. Hautala, 12750 Rosemary, Oak Park, Mich.
Filed June 25, 1962, Ser. No. 204,714
2 Claims. (Cl. 181—33)

This invention relates to camera enclosures and particularly, aims to provide a soundproof camera enclosure as may be used in banks for photographing holdups.

A particular object of the present invention is to provide a novel and simple soundproof camera enclosure for such purposes.

One embodiment of the invention has been disclosed in the appended drawings.

In these drawings:

FIG. 2 is a side section view as if on line 2—2 of FIG. 1.

FIG. 3 is a plan section view as if on line 3—3 of FIG. 2.

Figure 1:
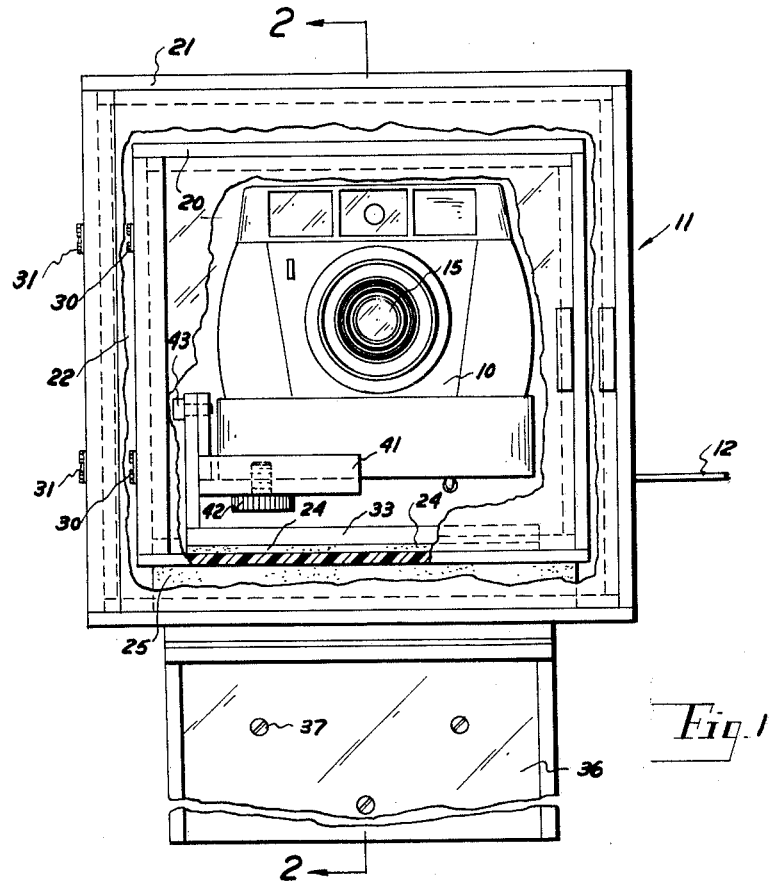
FIG. 1 is a front view with parts cut away showing the enclosure with a camera inside.
Figure 4:
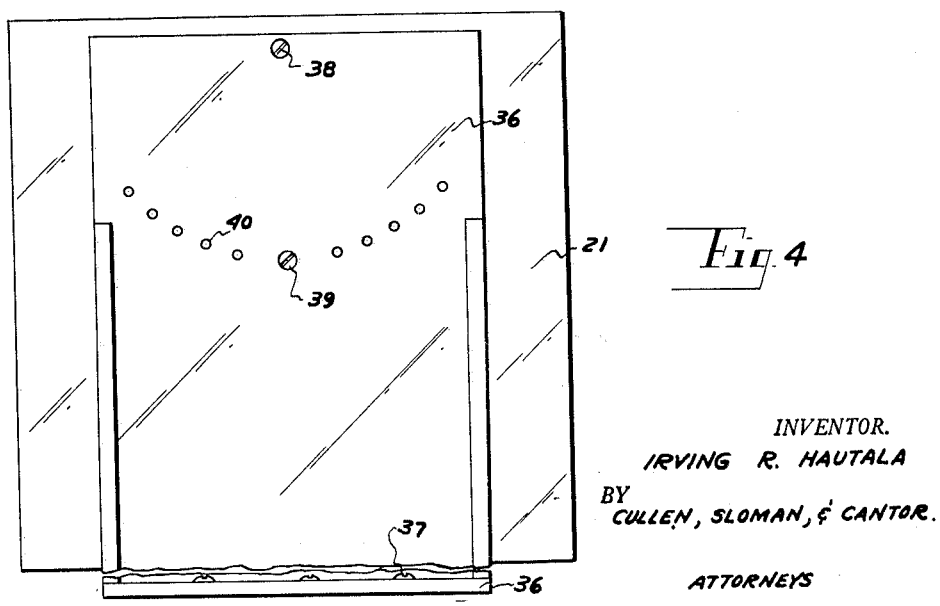
FIG. 4 is a bottom plan view as if on line 4—4 of FIG. 2.

The drawings show, in combination, an electrically operated camera and motor such as a rapid sequence camera, referenced generally 10, of a nature whose operation is audible. To permit operation of the camera without its sounds being heard there is supplied a soundproof enclosure, referenced generally 11, containing the camera and motor, the latter being supplied by an electric supply cord 12 passing through a rear wall of the enclosure with the latter having a transparent front wall referenced generally 14, facing the camera lens 15.

The enclosure comprises two nested boxes 20 and 21 with a sound-deadening medium such as an air space 22 between the two boxes. The camera 10 is mounted on and rests upon a shockproof rubber pad 24 inside and on the bottom of the inner box 20 and the latter in turn is mounted on and rests on the shock-proof pad 25 inside and on the bottom of the outer box 21.

The enclosure thus may be seen to comprise two cubes 20–21, one inside the other with air space 22 between them. Each cube is made of thin panels of transparent, rigid sheet material such as "Lucite," or other plastic material.

The two transparent box walls 28 and 29 which face the camera lens 15 are hingedly mounted by hinges 30 and 31, as shown best in FIG. 1 to enable the enclosure to be opened for servicing the camera.

The camera 10 is anchored within the inner box 20 by means of an L-shaped bracket part 33 under which is the rubber pad 24. L-shaped camera support 41 receives and anchors camera 10 as by fastener 42. Support 41 is pivotally mounted at 43 to bracket 33 for regulating the angularity of the camera about a horizontal axis.

The enclosure as a whole is mounted in any suitable location by means of a turret-type mounting comprising a bracket 36 fastened to a wall or support by screws 37 and which swivelly mounts the enclosure by means of screws 38 and 39, the latter being selectively positioned in any one of a number of registering holes 40 as the enclosure swivels on the axis of screw 38.

The air space 22 between the two boxes 20–21 acts as a sound deadener so as not to distract a holdup man during the operation of the camera which is normally operated by a burglar alarm and might otherwise have its operation heard. So enclosed, the camera is inaudible.

The electric supply cord 12 for the camera may actually be merely the remote control mechanism, inasmuch as many cameras will have their own battery or other power supply.

Now having described the combined camera and soundproof enclosure therefor, in its preferred embodiment disclosed in the attached drawing, reference should be had to the claims which follow:

I now claim:

1. In combination, a support;
an outer cubic box having a first bottom wall mounted on said support;
a shock proof resilient pad interposed between said bottom wall and support;
an inner cubic box nested within the outer box inwardly of its walls and including a second bottom wall spaced above said first bottom wall;
a shock proof resilient pad interposed between said bottom walls;
an electrically operated camera and motor therefor, whose operation is audible, enclosed within said inner box and adjustably mounted upon said second bottom wall;
a shock proof resilient pad interposed between said camera and motor and said second bottom wall;
an electrical supply cord for said motor passing through the walls of said boxes;
the walls of both boxes including thin panels of transparent rigid sheet material;
there being a sound deadening air space between the inner and outer boxes defining a sealed sound proof enclosure for the camera and motor.

2. In the camera enclosure of claim 1, each box including a front panel hingedly mounted thereon and facing the camera lens.

References Cited in the file of this patent

UNITED STATES PATENTS

| | | |
|---|---|---|
| 1,818,162 | Robbins et al. | Aug. 11, 1931 |
| 1,929,626 | De Forest | Oct. 10, 1933 |
| 1,932,691 | Cole | Oct. 31, 1933 |
| 1,962,441 | Haddock | June 12, 1934 |
| 1,982,221 | McClay | Nov. 27, 1934 |
| 2,218,425 | Heinisch | Oct. 15, 1940 |

FOREIGN PATENTS

| | | |
|---|---|---|
| 63,326 | Norway | Mar. 10, 1941 |
| 97,503 | Sweden | Nov. 28, 1939 |
| 368,461 | Great Britain | Mar. 10, 1932 |
| 784,045 | France | Apr. 23, 1935 |